(12) United States Patent
Yu et al.

(10) Patent No.: US 11,380,237 B2
(45) Date of Patent: Jul. 5, 2022

(54) DISPLAY DEVICE AND DISPLAY METHOD

(71) Applicant: Appotronics Corporation Limited, Shenzhen (CN)

(72) Inventors: Xin Yu, Shenzhen (CN); Fei Hu, Shenzhen (CN); Zu-Qiang Guo, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 16 days.

(21) Appl. No.: 16/981,383

(22) PCT Filed: Nov. 5, 2018

(86) PCT No.: PCT/CN2018/011388
§ 371 (c)(1),
(2) Date: Jan. 13, 2021

(87) PCT Pub. No.: WO2019/174274
PCT Pub. Date: Sep. 19, 2019

(65) Prior Publication Data
US 2021/0134208 A1 May 6, 2021

(30) Foreign Application Priority Data

Mar. 16, 2018 (CN) .......................... 201810219777.5

(51) Int. Cl.
*G09G 5/10* (2006.01)
*H04N 9/31* (2006.01)
*G09G 3/20* (2006.01)

(52) U.S. Cl.
CPC ............. *G09G 3/2003* (2013.01); *G09G 5/10* (2013.01); *H04N 9/3158* (2013.01);
(Continued)

(58) Field of Classification Search
CPC ............. G09G 2320/0666; G09G 5/10; G09G 3/2003; H04N 9/3182; H04N 9/3161; H04N 9/3158
See application file for complete search history.

(56) References Cited

U.S. PATENT DOCUMENTS 10,139,716 B1 * 11/2018 Tian .................. G02B 27/1006
2003/0234911 A1 12/2003 Horvath et al.
(Continued)

FOREIGN PATENT DOCUMENTS

CN 101119459 A 2/2008
CN 102563544 A 7/2012
(Continued)

*Primary Examiner* — Antonio Xavier
(74) *Attorney, Agent, or Firm* — ScienBiziP, P.C.

(57) ABSTRACT

The display device comprises a light source device, an image pre-processing controller, and a light modulation device. The light source device emits first light and second light, wherein a color gamut range of the second light is wider than that of the first light. The image pre-processing controller acquires a color gamut range of the image to be displayed and a brightness value of each pixel based on original image data of an image data to be displayed, and determines a current color gamut range and controls the light source device to emit first light and the second light corresponding to amount of light required in the current color gamut range. The light modulation device modulates the light emitted by the light source device to generate image light of the image to be displayed based on image data corresponding to the current color gamut range.

18 Claims, 9 Drawing Sheets

(52) U.S. Cl.
CPC ......... *H04N 9/3161* (2013.01); *H04N 9/3182* (2013.01); *G09G 2320/0666* (2013.01)

(56) References Cited

U.S. PATENT DOCUMENTS

| | | | |
|---|---|---|---|
| 2018/0129123 A1* | 5/2018 | Guo | G03B 21/20 |
| 2019/0238809 A1* | 8/2019 | Davies | G09G 3/003 |
| 2020/0120318 A1* | 4/2020 | Stauder | H04N 9/3182 |

FOREIGN PATENT DOCUMENTS

| | | | | |
|---|---|---|---|---|
| CN | 103543582 A | | 1/2014 | |
| CN | 106154711 A | | 11/2016 | |
| CN | 106164743 A | | 11/2016 | |
| CN | 106292142 A | | 1/2017 | |
| CN | 106537899 A | | 3/2017 | |
| JP | 2014174242 A | | 9/2014 | |
| WO | WO-2016161924 A1 * | 10/2016 | ........... | G03B 21/008 |

* cited by examiner

DISPLAY DEVICE AND DISPLAY METHOD

TECHNICAL FIELD

The present disclosure relates to a field of display technology, and particularly to a display device and a display method.

BACKGROUND

Light sources of display devices, such as laser projectors, are generally divided into three types, one of which generates primary color light of three primary colors of red, green, and blue by exciting phosphors with different colors through laser light having a short wavelength, another of which directly utilizes three colors including red, green, and blue of laser light as light sources for three primary colors, the third one of which is a combination of the first two types in which a general blue laser light source is taken as an excitation light source with a short wavelength to excite the phosphors to produce red and green primary lights, and itself can be a blue primary light. These three different implementation technologies have respective advantages and disadvantages. For the solution of laser light exciting the phosphor or laser light mixed with fluorescence, due to the features of high efficiency, long lifetime, and operation stability of the semiconductor blue laser light with the gallium nitride substrate, the solution of exciting the phosphor wheel by the blue semiconductor laser light has the features of long lifetime, high efficiency, equipment stability, and low cost. However, due to the wide spectrum of the fluorescence excited from the phosphor (i.e., fluorescence phosphor), the color gamut of this solution is relatively narrow. Generally, the display device using this technology can cover the complete sRGB color gamut, with some enhancement processing, such as removing the yellow light spectrum within the green light and the red light by adding a narrow-band optical filter, which can enhance the color gamut to reach the DCI-P3 color gamut. However, narrow-band filtering may lose great brightness of light, thereby greatly reducing the efficiency of the display device. Due to the good monochromaticity of RGB laser light, display devices using pure RGB laser light has a very wide color gamut range. Display devices using RGB laser light (such as projection systems) can easily reach the color gamut standard of REC2020, in regard to a comparison diagram of color gamut of the foregoing display devices, please refer to FIG. 1.

However, display devices using RGB laser light (such as projectors) also suffer from a number of drawbacks. The first is speckle. Due to the coherence of the laser light, the speckle is uneven brightness distribution of the display frame caused by the interference of the light reflected by the display surface, and the interference is caused by the phase difference generated by the undulating surface. Although many applications attempts to solve the problem of laser speckle, the effects are not ideal. The second is the high cost of the display devices using RGB laser light. Because the red and green laser light in the display devices using RGB laser light are not mature upon the current technology. Currently, the efficiency of the semiconductor green laser light can be only 20% or less, which is much lower than the blue laser light with the gallium nitride substrate and the red laser light with the ternary substrate, and the semiconductor green laser light has high cost. Although the efficiency of the red laser light is almost the same as that of the blue laser light, the temperature stability of the red laser light is poor, not only the efficiency of the red laser light is significantly decreased as the temperature increases, but also the center wavelength of the red laser light will drift. These two drawbacks make the display devices using RGB laser light to generate color shift with temperature change. The working state of the red laser is needed to be stabilized by adding a thermostatic device to the red laser, it means that a cooling device with a high power is required to ensure the stability of the working temperature of the red laser, the cost of the display devices using RGB laser light is thus greatly increased.

A basic light source 200 of laser light exciting phosphor wheel is shown in FIG. 2 (as disclosed in Chinese patent application CN201110424486.8), visible light with a short wavelength emitted by the excitation light source 210 excites the phosphors on the color wheel 220 to generate time-ordered primary color light or white light. Due to the wide spectrum of fluorescence, the color gamut coverage based on this system is relatively narrow. An improved method for enhancing color gamut is shown in FIG. 3 (as disclosed in Chinese patent application CN201110191454.8). The visible light with a short wavelength emitted by the excitation light source 310 is converted into the primary color light by the color wheel 320, and the primary color light with a higher narrowband color purity is obtained by the filtering of the synchronous filter device 330, to extend the color gamut of the laser fluorescence. The optical filtering device may bring additional optical power loss, thereby reducing the efficiency of the display device.

The color gamut of the light source can also be extended by incorporating pure red and green laser light into the laser fluorescence. Optical systems involving incorporating pure color laser light into the laser fluorescence have been reported, an implementation scheme of incorporating a kind of pure color lasers into a laser fluorescence system as proposed in one prior art (as disclosed in U. S. Patent Application US20150316775A1), and an optical path implementation scheme of incorporating one or two kinds of pure laser light mentioned in the other prior art (such as Chinese Patent Application CN201110191454.8), or the like. Although incorporating pure color laser light can extend the color gamut of the laser fluorescence, there is no modulation on the ratio of the light source based on the display content, the enhanced color gamut range is limited. As shown in FIG. 4, based on adding a mixed light (mix gamut) of pure color laser light having a fluorescence luminance of 20% (as shown in FIG. 4a), if it is necessary to extend the color gamut of the laser fluorescence to the DCI-P3 standard, it is necessary to add pure color laser light having a fluorescence luminance of 40% (as shown in FIG. 4b), to form the mixed light. Compared with the solution of fluorescence adding color filters, the efficiency of the display device in this solution is higher, but the system cost is increased by the requirement of adding high-power red and green laser light.

SUMMARY

In order to solve a technical problem that cost of a light source of a display device with a wide color gamut is relatively high in the prior art, the present disclosure provides a display device and a display method that can realize a relatively wide color gamut and reduce the cost of the light source.

A display device including:

a light source device that emits first light and second light; wherein the first light is used to be modulated for images of a first color gamut range, the second light is used to be modulated separately or jointly in cooperation with the first light for images other than the first color gamut range, and a color gamut range of the second light is a second color gamut range which covers the first color gamut range and has a portion exceeding the first color gamut range;

an image preprocessing controller that receives original image data of an image to be displayed, and acquires a color gamut range and a brightness value of each of pixels of the image to be displayed based on the original image data of the image to be displayed, determines a current color gamut range and amount of each of the first light and the second light corresponding to the current color gamut range based on the color gamut range and the brightness value of each of the pixels of the image to be displayed, outputs a light amount control signal based on the amount of the first light and the second light for controlling the amount of the first light and the second light emitted from the light source device; and a light modulation device that modulates light emitted by the light source device base on image data corresponding to the current color gamut range, so as to generate image light of the image to be displayed, wherein the image data corresponding to the current color gamut range are acquired by the image preprocessing controller or the light modulation device through converting the original image data of the image to be displayed.

A display method including:

providing first light and second light; wherein the first light is used to be modulated for images of a first color gamut range, the second light is used to be modulated separately or jointly in cooperation with the first light for images other than the first color gamut range;

receiving original image data of an image to be displayed and acquiring a color gamut range and a brightness value of each of pixels of the image to be displayed based on the original image data of the image to be displayed;

determining a current color gamut range and amount of each of the first light and the second light corresponding to the current color gamut range based on the color gamut range and the brightness value of each of the pixels of the image to be displayed;

outputting a light amount control signal based on the amount of the first light and the second light for controlling the amount of the first light and the second light emitted from the light source device;

acquiring image data of the image to be displayed corresponding to the current color gamut range based on the original image data of the image to be displayed; and;

modulating light emitted by the light source device base on image data corresponding to the current color gamut range, so as to generate image light of the image to be displayed.

Compared with the prior art, in the display device and the display method of the present disclosure, the current color gamut range and the amount of the first light and the second light corresponding to the current color gamut range are determined based on the color gamut range of the image to be displayed and the brightness value of the pixels, and the first light and the second light corresponding to the amount of light are modulated based on the image data corresponding to the current color gamut range, not only the display of image data with a wide color gamut is realized, adjusting the amount of the first light and the second light based on the current color gamut range can also minimally utilize the wide color gamut light (i.e. the second light), thereby reducing the use of the second light, and further reducing the cost of the light source device. Further, due to the reduced use of the second light, the power and heat dissipation requirements of the light source device are reduced with a certain extent, a complicated heat dissipation system is not required, and the cost can thus be reduced.

DESCRIPTION OF MAIN COMPONENT SYMBOLS

Figure 1:
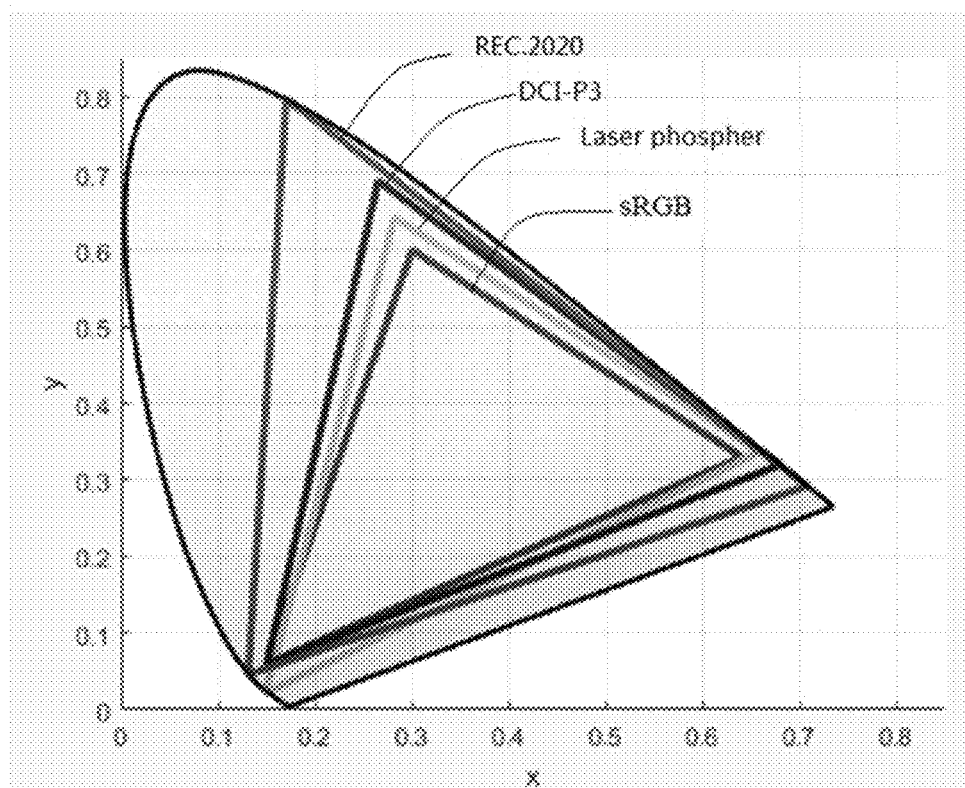
FIG. 1 is a comparison diagram of color gamut ranges of several kinds of display devices using different light sources.
Figure 2:
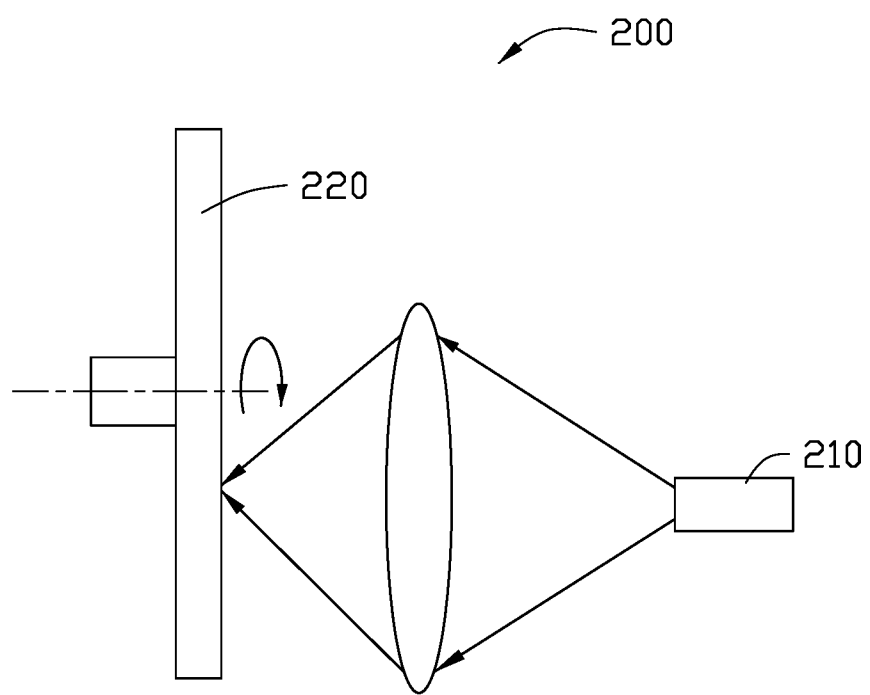
FIG. 2 is a schematic view of a light source structure of a display device in prior arts.
Figure 3:
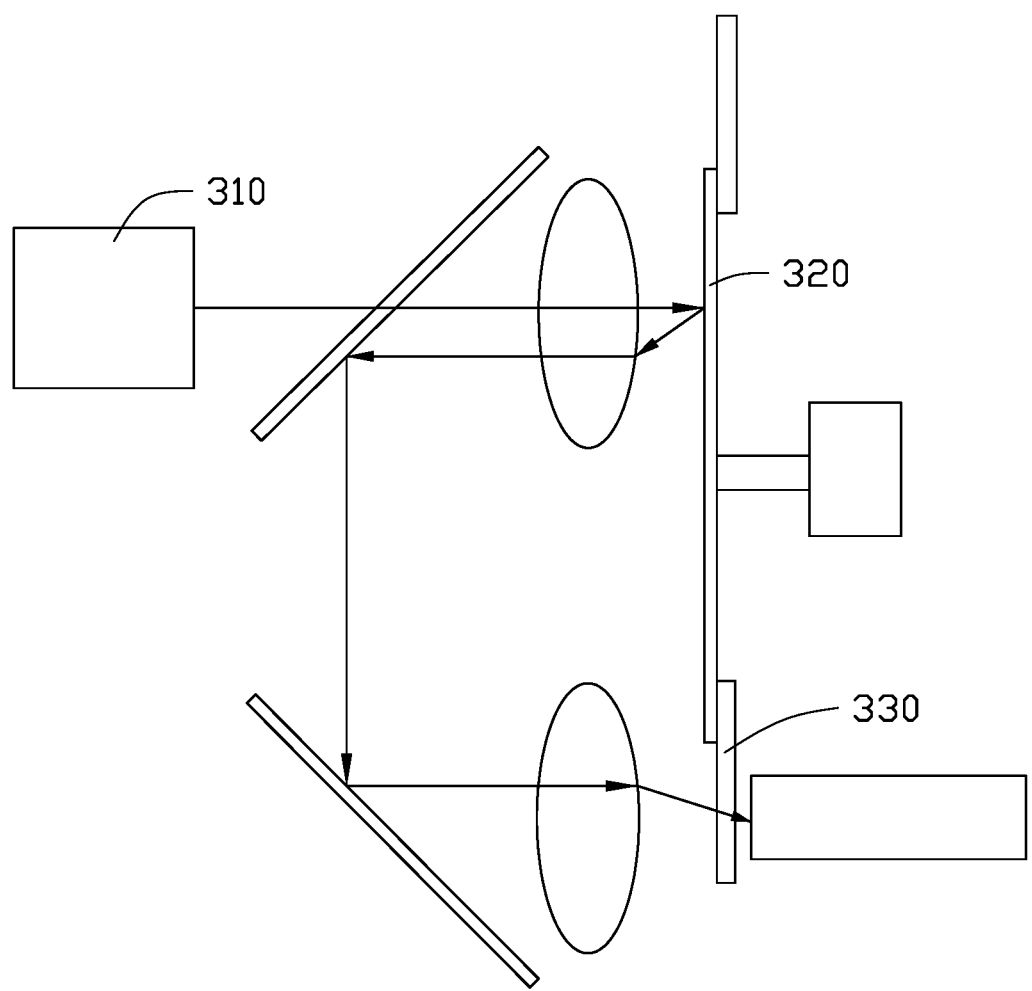
FIG. 3 is a schematic view of another light source structure of a display device in prior arts.
Figure 4A:
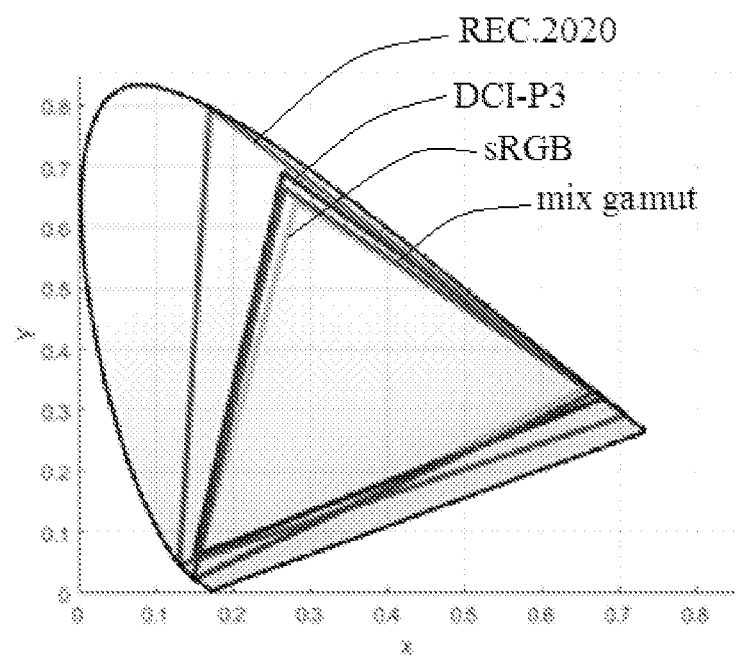
FIGS. 4a and 4b are schematic views of color gamut ranges achieved by adding pure-colored laser light in different proportions to the display device shown in FIGS. 2 and 3, respectively.
Figure 4B:
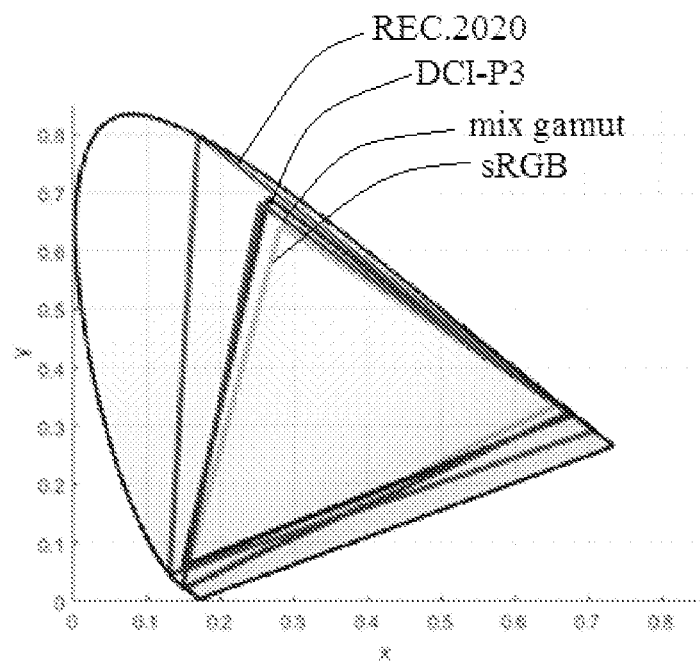

Display device 500, 500'
Light source device 510, 510'
Light source driving circuit 520
Gamma correction circuit 530
Image preprocessing controller 540, 540'
Light modulation device 550, 550'
Image synthesizing device 560
Excitation light source 511
Color wheel 512
Supplemental light source 513
Light splitting and combining device 514
Light homogenizing device 515
Relay lens 516
Interface circuit 570
Video processing circuit 580
Image processing circuit 590
Color gamut range F1, F2, F3, F4
Control chip 551
Modulator 552
Light splitting module 561
Projection lens 562
Step S1, S2, S3, S4, S5, S6

The following detailed description of embodiments will further illustrate the present disclosure by combining with the above drawings.

DETAILED DESCRIPTION OF EMBODIMENTS

Based on the above, by using a wide color gamut light source (such as an RGB trichromatic pure laser light source) or a mixed light source of the wide color gamut light source and a fluorescence source, a display device can reach a color gamut standard of Rec.2020. However, there are technical problems including high cost (e.g. the red laser and the green laser are expensive and the efficiency of electro-optical conversion is relatively low), etc. The present disclosure provides a display device and a display method that can reduce the use of the wide color gamut light source.

In one embodiment of the present disclosure, laser light emitted by a wide color gamut light source is added in addition to fluorescence, and a method for dynamically enhancing a color gamut is provided, so that the display device can reach and exceed the color gamut standard of DCI-P3 while maintaining high efficiency. Further, a solution for dynamically adjusting brightness of first light (such as the fluorescence) and second light (such as red and green laser light) based on content of a display image is provided by the present disclosure, which can greatly enhance a color gamut displayed by the system without changing the second light, and greatly reduce the required power of the second light, the use of the wide color gamut light source, and the cost of the display device at the same time, while keeping the change of the color gamut of the display device small. Specifically, the brightness and the color gamut of the light emitted by the light source device of the display device changes with image data of an image to be displayed, so as to enable the light source device not to always work at the maximum power, thereby reducing the energy consumption and the heat dissipation burden of the device, and reducing the cost of the heat dissipation device and the thermostatic device.

Figure 5:
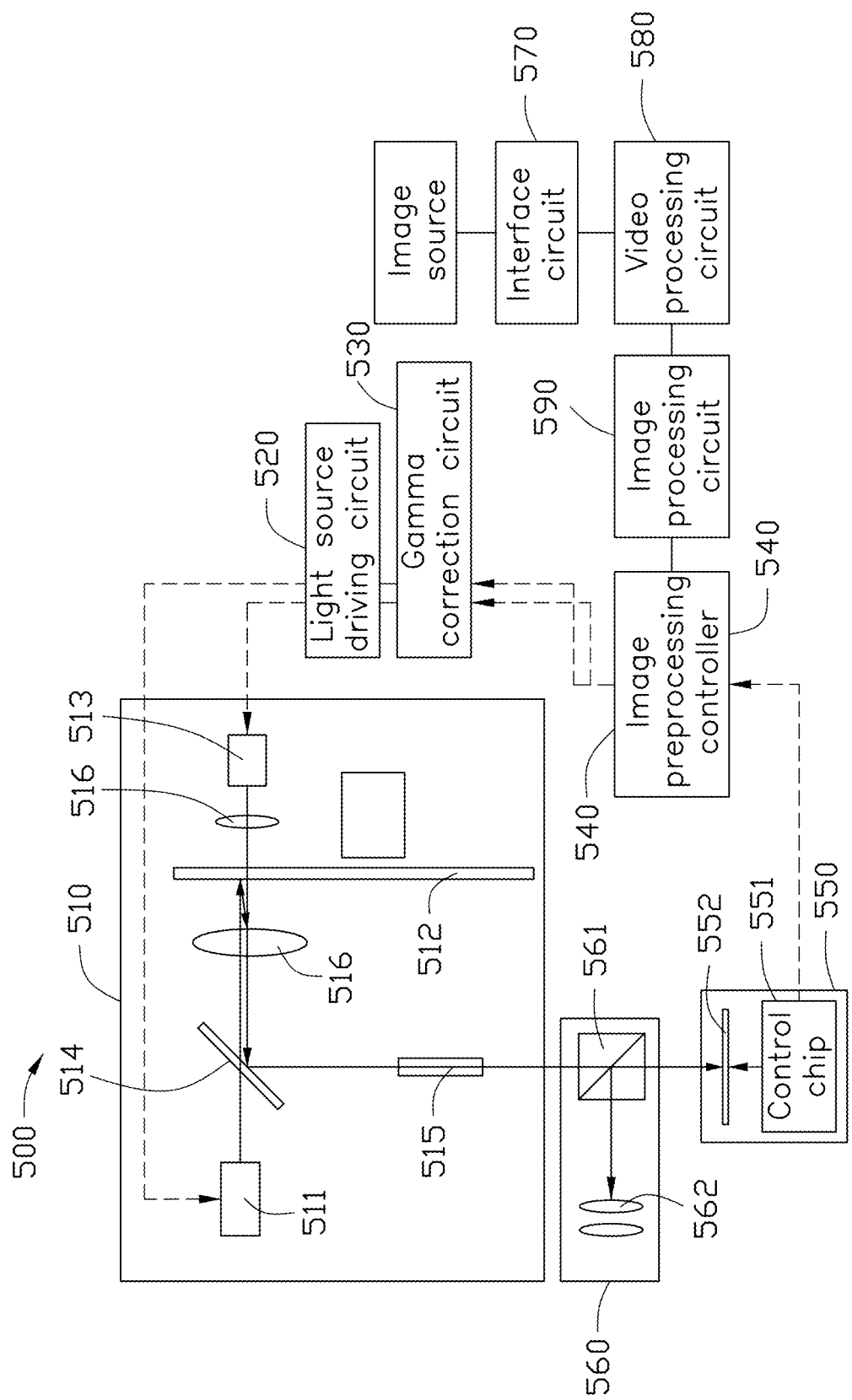
FIG. 5 is a schematic view illustrating a structure of a display device based on a preferred embodiment of this disclosure.

A specific structure and principles of the display device and the display method of the present disclosure will be described specifically below with reference to the accompanying drawings. Referring to FIG. 5, FIG. 5 is a schematic view illustrating a structure of a display device 500 based on a preferred embodiment of the present disclosure. The display device 500 includes a light source device 510, a light source driving circuit 520, a gamma correction circuit 530, an image preprocessing controller 540, a light modulation device 550, and an image synthesizing device 560.

Figure 6:
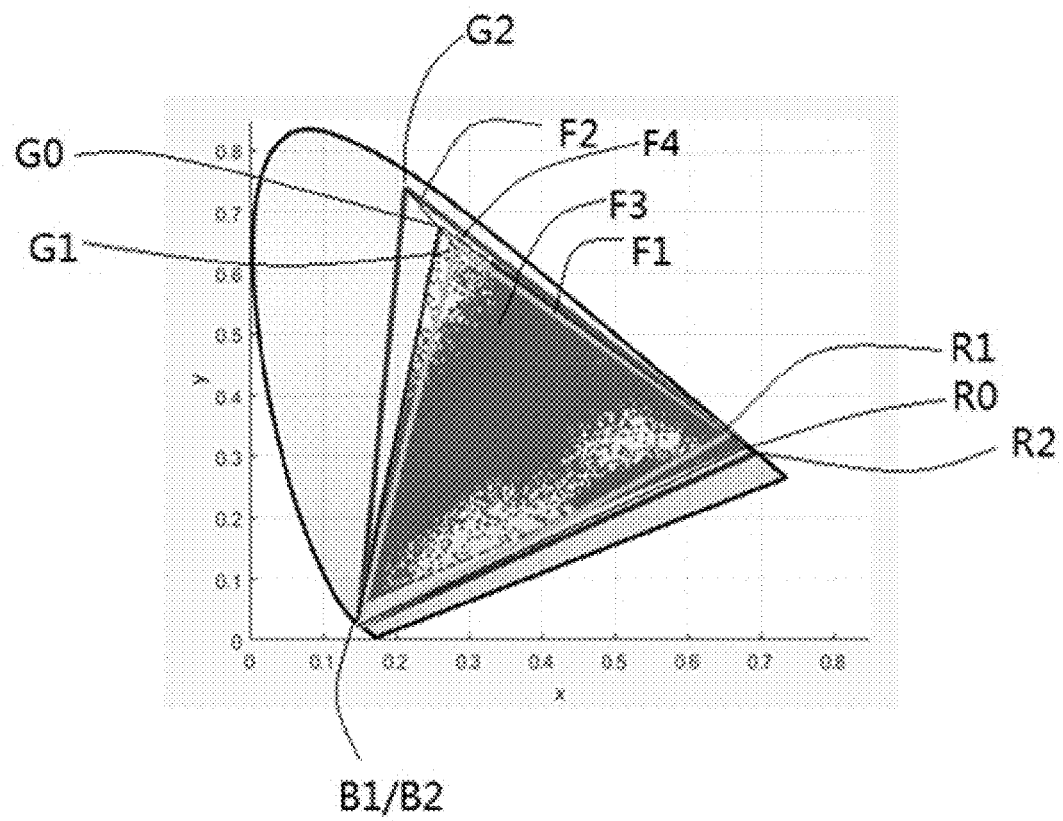
FIG. 6 is a schematic view of a current color gamut range of the display device shown in FIG. 5.

The light source driving circuit 520 is electrically connected to the light source device 510, and is configured to transmit a driving signal to drive the light source device 510 to emit light. Specifically, the light source device 510 is configured to emit light of light source. The light of light source can include first light and second light. The first light is used to be modulated for images of a first color gamut range F1. A color gamut range of the second light is wider than that of the first light. The second light is used to be separately modulated or cooperated with the first light to jointly modulate images outside the first color gamut range F1. The color gamut range of the second light is a second color gamut range F2. The second color gamut range F2 covers the first color gamut range F1 and has a portion exceeding the first color gamut range F1. Specifically, referring to FIG. 6, FIG. 6 is a schematic view illustrating a color gamut range of the display device 500 shown in FIG. 5, the first color gamut range F1 is a color gamut range that can be shown by the first light, and it can be the color gamut range of DC1, such as the color gamut range of DCI-P3. The second color gamut range F2 can be the color gamut range of REC, such as the color gamut range of REC.2020.

It can be understood that, the first light and the second light can both include at least two colors of light, for example, include three colors of light, that is, red, green, and blue. Specifically, the light source device 510 includes an excitation light source 511, a color wheel 512, a supplemental light source 513, and a light splitting and combining device 514. The excitation light source 511 emits an excitation light which can be first color light (such as blue light). The color wheel 512 has a fluorescence material and receives the excitation light to generate fluorescence. The color wheel 512 is configured to receive the excitation light and emit the first light, and the first light emitted by the color wheel 512 includes the first color light and the fluorescence. The supplemental light source 513 is configured to emit supplemental light, and the supplemental light can include laser light. The fluorescence light and the supplemental light include a same primary color component. The supplemental light and at least part of the excitation light emitted by the excitation light source 511 is taken as the second light, or the supplemental light is separately taken as the second light. It can be understood that, in this embodiment, the light source driving circuit 520 can control the light source device 510 to emit the first light and the second light, by transmitting driving signals to the excitation light source 511 and the supplemental light source 513.

Further, the fluorescence includes second color fluorescence (such as red fluorescence) and third color fluorescence (such as green fluorescence), or the fluorescence includes fourth color fluorescence (such as yellow fluorescence) mixed with a second color and a third color (such as red and green). The supplemental light includes a second color laser light (such as a red laser light) and a third color laser light (such as a green laser light). The first, second, and third colors are three primary colors.

In the embodiment, the excitation light source 511 can be a blue laser light source, and emit blue excitation light. The color wheel 512 can include at least two segments arranged in sequence along a circumferential direction, such as a blue segment and a yellow segment, or a blue segment, a red segment, and a green segment. The blue segment can be provided with a scattering material. At least one of the segments is provided with a fluorescence material. For example, the yellow segment is provided with yellow fluorescence material, or the red and green segments are provided with red and green fluorescence material, respectively, and each of the two segments emits one color of light. For example, the blue segment scatters the blue excitation light to emit blue light, the yellow segment emits yellow light, or the red and green segments emit red light and green light respectively. Thus, there are at least two segments for emitting at least two colors of light, such as the blue light and the yellow light, or the blue light, the red light, and the green light. It can be understood that, the yellow light includes components of the red light and the green light, that is, the first light can include the three primary colors of red, green, and blue.

Further, the excitation light emitted by the excitation light source 511 is incident to the color wheel 512 via the light splitting and combining device 514 (such as transmission). The color wheel 512 rotates in the circumferential direction when working, so that the respective segments are sequentially located on an optical path where the excitation light is located. A segment of the color wheel 512 guides (e. g. reflects) received excitation light to the light splitting and combining device 514 in a first time period, and the other one or two segments of the color wheel 512 receive the excitation light to generate the fluorescence and reflect the fluorescence to the light splitting and combining device 514 in other time periods. The excitation light and the fluorescence emitted from the color wheel 512 to the light splitting and combining device 514 are taken as the first light, and the light splitting and combining device 514 further provides (e. g. reflects) the first light to the light modulation device 550. The color wheel 512 can be a reflective color wheel, and the light splitting and combining device 514 can include a light splitting and synthesizing film.

Further, in a modified embodiment, the excitation light source 511 and the color wheel 512 can also be replaced by a light-emitting diode. That is, the light-emitting diode emits the first light which includes the fluorescence. Specifically, the first light can include at least two colors of light, such as the blue light and the yellow light, or the blue light, the red light, and the green light.

The supplemental light can include laser light. Specifically, the supplemental light source 513 can include laser light of at least two colors, such as a red laser light and a green laser light, so as to emit at least two colors of laser light, such as red laser light and green laser light. At this time, the supplemental light (such as the red laser light and the green laser light) and the at least part of the excitation light (the blue excitation light) emitted by the excitation light source 511 are taken as the second light. In a modified embodiment, the supplemental light can also include laser light, and the supplemental light source 513 can include laser light of at least two colors, such as a blue laser light, a red laser light, and a green laser light, so as to emit at least two colors of laser light, such as blue laser light, red laser light, and green laser light. At this time, the supplemental light (such as the blue laser light, the red laser light, and the green laser light) is taken as the second light. It can be understood that, in a modified embodiment, a color of the supplemental light emitted by the supplemental light source can be selected based on actual needs. Specifically, the supplemental light source can also include a laser light that emits light of one color, for example, the supplemental light source includes a red laser light that emits the red light, a green laser light that emits the green light, or a yellow light source that emits the yellow light.

In the embodiment, the supplemental light source 513 further emits the supplemental light to the color wheel 512. One of the segments of the color wheel 512 further receives the excitation light in a second time period which is different from the first time period, and the color wheel 512 further guides the supplemental light and the excitation light received in the second time period to the light splitting and combining device 514 as the second light. The light splitting and combining device 514 guides (e.g. reflects) the second light to the light modulation device 550. Specifically, the color wheel 512 can transmit the supplemental light to the light splitting and combining device 514, and the color wheel 512 reflects the excitation light to the light splitting and combining device 514 in the second time period.

In a modified embodiment, when the supplemental light source 513 emits the supplemental light as the second light, one of the segments of the color wheel 512 can transmit the supplemental light to the light splitting and combining device 514, and the light splitting and combining device 514 guides the second light to the light modulation device 550.

Specifically, the light source device 510 can further include a light homogenizing device 515 (such as a light homogenizing square rod) and a relay lens 516. The relay lens 516 can be arranged between the supplemental light source 513 and the color wheel 512, and between the color wheel 512 and the light splitting and synthesizing light device 514. The light homogenizing device 515 can be arranged between the light splitting and combining device 514 and the light modulation device 550, and configured to homogenize the first light and the second light, and guide the first light and the second light to the light modulation device 550.

The image preprocessing controller 540 is configured to receive original image data of an image to be displayed. It is understood that, in one embodiment, the display device 500 can further include an interface circuit 570, a video processing circuit 580, and an image processing circuit 590. The video processing circuit 580 and the image processing circuit 590 are connected between the interface circuit 570 and the image preprocessing controller 540 in sequence. The interface circuit 570 (e.g. a VGA interface circuit, an HDMI interface circuit, a DP interface circuit, or a DVI interface circuit, etc.) can receive image data in a designated format (e.g. VGA, VGA, DP, or DVI) from an external image source (e.g. a smart device such as a computer or the like). The video processing circuit 580 can decode the image data in the designated format and provide it to the image processing circuit 590. The image processing circuit 590 can perform steps of trapezoidal correction, edge fusion, consistency correction or the like on the decoded image data to acquire the original image data, and provide the original image data to the image preprocessing controller 540. Of course, in a modified embodiment, the image processing circuit 590 can also be removed based on actual needs, so that the video processing circuit 580 directly provides the decoded image data to the image preprocessing controller 540 as the original image data.

Specifically, the image preprocessing controller 540 acquires a color gamut range and a brightness value of each pixel of the image to be displayed based on the original image data of the image to be displayed. The image preprocessing controller 540 further determines a current color gamut range and amount of the first light and the second light corresponding to the current color gamut range, based on the color gamut range and the brightness value of each pixel of the image to be displayed. The image preprocessing controller 540 outputs light amount control signals based on the amount of the first light and the second light, for controlling the amount of the first light and the second light emitted by the light source device 510. Further, in the embodiment, the image preprocessing controller 540 further acquires corrected image data of the image to be displayed corresponding to the current color gamut range based on the original image data of the image to be displayed.

The light amount control signals are used to control the amount of light of the first light and the second light by controlling the excitation light emitted by the excitation light source 511 and the supplemental light emitted by the supplemental light source 513. It can be understood that, the amount of light can refer to the amount of light within an image modulation time (i.e. an image display time) of the image to be displayed, and it can be further understood that, in the case that time for providing the first light and the second light is determined, the control of the amount of light can be realized by controlling the brightness (i.e. the light intensity) of the first light and the second light. The light amount control signals can include a first control signal for controlling the first light and a second control signal for controlling the second light.

The image preprocessing controller 540 acquires the brightness value of each pixel of the image to be displayed based on the original image data of the image to be displayed, and can generate the first control signal based on a maximum brightness value of individual pixels of the image to be displayed to control the brightness of the first light emitted by the light source device 510, so as to control the amount of the first light. The image preprocessing controller 540 can also acquire color coordinates of each pixel of the image to be displayed based on the original image data of the image to be displayed. A range defined by the color coordinates of the pixels of the image to be displayed is the color gamut range of the image to be displayed. Thus, the image preprocessing controller 540 can also acquire the color gamut range of the image to be displayed based on the original image data of the image to be displayed.

Further, in the embodiment, the original image data of each pixel of the image to be displayed is in an RGB coding format, but it can be understood that, in a modified embodiment, the original image data of each pixel of the image to be displayed is not limited to be in the RGB coding format, and can also be in a YUV coding format or the like. Further, the original image data of each pixel of the image to be displayed can include the original image data of the three primary colors, such as original image data r of red color, original image data g of green color, and original image data b of blue color. In one embodiment, r, g, and b can be represented by grayscale values, for example, the original image data r, g, and b of any pixel can be grayscale values 100, 120, and 150, respectively.

Further, the original image data of each pixel of the image to be displayed has a color gamut range to which it belongs. Further, information of the color gamut range to which the original image data of each pixel of the image to be displayed belongs is known or can be acquired. Specifically, in one embodiment, in addition to the three primary color image data of each pixel, the original image data of each pixel of the image to be displayed can further include the information of the color gamut range to which the original image data belongs. Further, after the image preprocessing controller 540 receives the original image data of each pixel of the image to be displayed, the image preprocessing controller 540 can acquire the color gamut range to which the original image data of each pixel of the image to be displayed belongs based on the information of the color gamut range of the original image data. In the embodiment, the original image data of each pixel of the image to be displayed can be image data in a wider color gamut range, such as image data of the second color gamut range, that is, image data of the color gamut range of REC.

Color coordinates $(x_r, y_r, Y_r)$, $(x_g, y_g, Y_g)$, and $(x_b, y_b, Y_b)$ of three vertices $r_0$, $g_0$, and $b_0$ of the color gamut range to which the original image data of each pixel of the image to be displayed belongs in a xyY coordinate system can be formulated by following formula 1:

$$\begin{bmatrix} r_O \\ g_0 \\ b_0 \end{bmatrix} = \begin{bmatrix} x_r & y_r & Y_r \\ x_g & y_g & Y_g \\ x_b & y_b & Y_b \end{bmatrix}.$$  (formula 1)

It can be understood that, the xyY coordinate system can be defined in the standard of CIE 1931. CIE 1931 uses a three-dimensional vector to define absolute colors and brightness of the colors that can be distinguished by any human eye, which do not change with change of the color gamut. As mentioned above, the information of the color gamut range to which the original image data of each pixel of the image to be displayed belongs is known or can be acquired, that is, the color coordinates $(x_r, y_r, Y_r)$, $(x_g, y_g, Y_g)$, and $(x_b, y_b, Y_b)$ of the three vertices $r_0$, $g_0$, and $b_0$ of the color gamut range to which the original image data of each pixel of the image to be displayed belongs in the xyY coordinate system are known or can be acquired. For example, if the original image data of each pixel of the image to be displayed is the image data of the color gamut range of REC.2020, the coordinates $(x_r, y_r, Y_r)$, $(x_g, y_g, Y_g)$, and $(x_b, y_b, Y_b)$ of the three vertices $r_0$, $g_0$, and $b_0$ are (0.708, 0.292, 0.2627), (0.17, 0.797, 0.6780), and (0.131, 0.046, 0.0593), respectively, based on the standard of the color gamut range of REC.2020.

Further, tristimulus values X, Y, and Z of the pixel calculated based on the original image data r, g, and b of any pixel of the image to be displayed are shown in formula 2:

$$\begin{bmatrix} X \\ Y \\ Z \end{bmatrix} = C \begin{bmatrix} r \\ g \\ b \end{bmatrix}.$$  (formula 2)

The conversion matrix C is a conversion matrix required when calculating the corresponding tristimulus values X, Y, and Z based on the original image data of each pixel of the image to be displayed and the information of the color gamut range to which it belongs. The conversion matrix C conforms to following formula 3:

$$C = \begin{bmatrix} \frac{x_r}{y_r} Y_r & \frac{x_g}{y_g} Y_g & \frac{x_b}{y_b} Y_b \\ Y_r & Y_g & Y_b \\ \frac{1-x_r-y_r}{y_r} Y_r & \frac{1-x_g-y_g}{y_g} Y_g & \frac{1-x_b-y_b}{y_b} Y_b \end{bmatrix}.$$  (formula 3)

Specifically, in one embodiment, the information of the color gamut range on which the original image data of the image to be displayed is based can include the conversion matrix C, that is, in addition to the original image data of the three primary colors, the original image data of the image to be displayed can store the conversion matrix C as the information of the color gamut range on which the original image data of the image to be displayed is based. But in a modified embodiment, the information of the color gamut range on which the original image data of the image to be displayed is based can also be the information of the color coordinates $(x_r, y_r, Y_r)$, $(x_g, y_g, Y_g)$, and $(x_b, y_b, Y_b)$ of the three vertices $r_0$, $g_0$, and $b_0$, designated characters or codes representing the information of the color gamut range or the like, which is not limited to the above.

Further, based on the above formulas 1, 2, and 3, the tristimulus values X, Y, and Z of any pixel can be calculated based on the original image data r, g, and b of the pixel of the image to be displayed and the information of the color gamut range to which it belongs, that is, the color coordinates $(x_r, y_r, Y_r)$, $(x_g, y_g, Y_g)$, and $(x_b, y_b, Y_b)$ of the three vertices $r_0$, $g_0$, and $b_0$. And among the tristimulus values X, Y, and Z, Y represents the brightness value of the pixel, and a relationship between the tristimulus values X, Y, Z and the color coordinates xy conforms to following formula 4:

$$\begin{bmatrix} X \\ Y \\ Z \end{bmatrix} = \begin{bmatrix} \frac{x}{y} \\ 1 \\ \frac{1-x-y}{y} \end{bmatrix} Y.$$  (formula 4)

Further, based on the above formulas 1-4, chromaticity data of CIE xyY of any pixel of the image to be displayed, that is, the color coordinates x, y, and the brightness value Y of each pixel, can be acquired based on the original image data r, g, and b of the pixel and the information of the color gamut range $(x_r, y_r, Y_r)$, $(x_g, y_g, Y_g)$, and $(x_b, y_b, Y_b)$ to which it belongs.

Further, the display device 500 has a default color gamut range, that is, the light modulation device 550 generally needs to store a color gamut conversion formula T corresponding to the default color gamut range. The default color gamut range of the display device 500 generally adapts to the color gamut range of the default light emitted by the light source device 510. The light modulation device 550 converts received image data into image data for modulation by the color gamut conversion formula T when working, and further modulates the default light emitted by the light source device 510 based on the image data for modulation, so as to accurately display images, and the displayed images meet the color gamut requirement. In general, the color gamut conversion formula T stored in the light modulation device 550 is fixed and unchanged, for example, the color gamut conversion formula T can be pre-stored in the light modulation device 550 during the manufacturing process of the display device 500, so that the display device 500 can generate the corresponding image data for modulation by the color gamut conversion formula T when working. The color coordinates of the three vertices $r_0'$, $g_0'$, and $b_0'$ of the color gamut range of the light provided from the light source device 510 to the light modulation device 550 are respectively assumed to be $(x_r', y_r', Y_r')$, $(x_g', y_g', Y_g')$, $(x_b', y_b', Y_b')$, it is understood that, the default color gamut range of the display device 500 relates to the color gamut range of the three primary colors of light emitted by the light source device 510. That is, when the three primary colors of light emitted by a light source device of a display device is fixed and unchanged, the default color gamut range of the display device is also known, that is, the default color gamut range is the color gamut range displayed by the three primary colors of light emitted by the light source device by default, so that the color coordinates $(x_r', y_r', Y_r')$, $(x_g', y_g', Y_g')$, and $(x_b', y_b', Y_b')$ of the three vertices $r_0'$, $g_0'$, and $b_0'$ are also vertices of the default color gamut range of the display device, and can be acquired by measuring the color gamut range of the three primary colors of light emitted by the light source device. For example, if the default color gamut range of the three primary colors of light emitted by the light source device 510 of the display device 500 is the color gamut range of REC.2020, the default color gamut range of the display device 500 is the color gamut range of REC.2020, and further, the coordinates $(x_r', y_r', Y_r')$, $(x_g', y_g', Y_g')$, and $(x_b', y_b', Y_b')$ of the three vertices $r_0'$, $g_0'$, and $b_0'$ are (0.708,0.292,0.2627), (0.17,0.797,0.6780), and (0.131, 0.046,0.0593), respectively, based on the standard of the color gamut range of REC.2020.

Further, the color coordinates $(x_r', y_r', Y_r')$, $(x_g', y_g', Y_g')$, and $(x_b', y_b', Y_b')$ of the three vertices $r_0'$, $g_0'$, and $b_0'$ of the default color gamut range of the display device 500 can be formulated by following formula 5:

$$\begin{bmatrix} r_0' \\ g_0' \\ b_0' \end{bmatrix} = \begin{bmatrix} x_r' & y_r' & Y_r' \\ x_g' & y_g' & Y_g' \\ x_b' & y_b' & Y_b' \end{bmatrix}. \quad \text{(formula 5)}$$

Further, based on the image data r', g', and b' of any pixel corresponding to the default color gamut range of the display device 500, tristimulus values X, Y, and Z of the pixel are calculated as shown in formula 6:

$$\begin{bmatrix} X \\ Y \\ Z \end{bmatrix} = C' \begin{bmatrix} r' \\ g' \\ b' \end{bmatrix}. \quad \text{(formula 6)}$$

The conversion matrix C' is a conversion matrix recorded by the light modulation device 550 and required when calculating the corresponding tristimulus values X, Y, and Z based on the image data of any pixel of the default color gamut range. The conversion matrix C' conforms to following formula 7:

$$C' = \begin{bmatrix} \dfrac{x_r'}{y_r'} Y_r' & \dfrac{x_g'}{y_g'} Y_g' & \dfrac{x_b'}{y_b'} Y_b' \\ Y_r' & Y_g' & Y_b' \\ \dfrac{1 - x_r' - y_r'}{y_r'} Y_r' & \dfrac{1 - x_g' - y_g'}{y_g'} Y_g' & \dfrac{1 - x_b' - y_b'}{y_b'} Y_b' \end{bmatrix}. \quad \text{(formula 7)}$$

No matter what the color gamut range corresponding to the image data of any pixel is, the tristimulus values X, Y, and Z of the pixel remain unchanged, and thus, based on the above formulas 1-6, a relationship between the original image data r, g, and b of any pixel and the image data r', g', and b' of a pixel corresponding to the default color gamut range of the display device 500 meets following formula 8:

$$\begin{bmatrix} r' \\ g' \\ b' \end{bmatrix} = C'^{-1} C \begin{bmatrix} r \\ g \\ b \end{bmatrix}. \quad \text{(formula 8)}$$

Based on the above description, the display device generally needs to convert the image data (such as the original image data r, g, and b) received by the light modulation device 550 into the image data r', g', and b', and further to modulate the light emitted by the light source device based on the image data r', g', and b' to accurately generate image light. It can be seen that, the color gamut conversion formula T stored in the light modulation device 550 for converting the received image data of any pixel into the image data corresponding to the default color gamut range of the display device 500 can conform to following formula 9:

$$T = C'^{-1} C \quad \text{(formula 9)}.$$

Based on the above formulas 8 and 9, if the original image data r, g, and b is output to the light modulation device 550, the light modulation device 550 can calculate the image data r', g', and b' based on the color gamut conversion formula T, and further modulate corresponding light of light source to generate accurate image light. In other words, the light modulation device 550 needs to store a fixed color gamut conversion formula T with respect to the default color gamut range of the display device 500, and thus, the image pre-processing controller 540 needs to consider an influence of the color gamut conversion formula T stored in the light modulation device 550 when converting the original image data into corrected image data. Hereinafter, with reference to FIG. 7, how the image preprocessing controller 540 acquires the corrected image data is further described.

Figure 7:
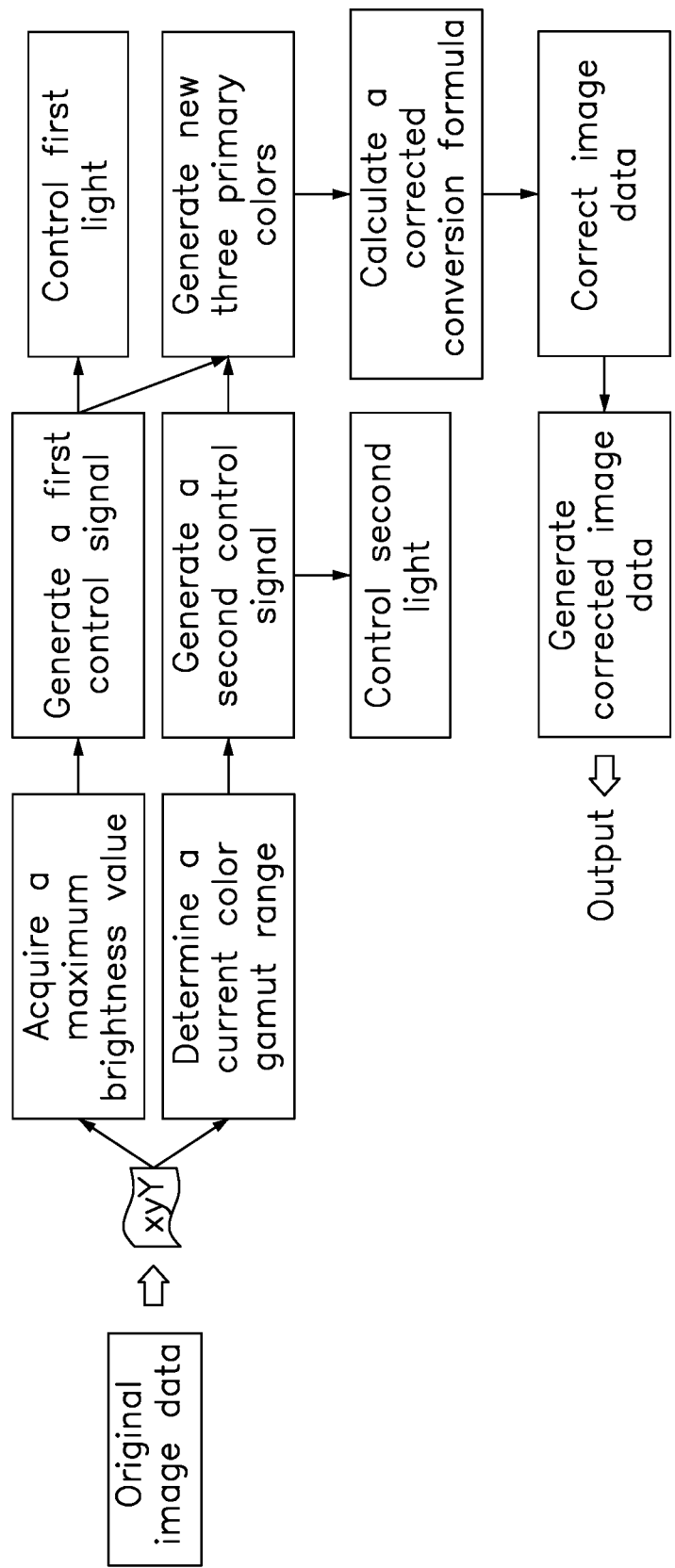
FIG. 7 is a schematic view illustrating an operating principle of an image preprocessing controller of the display device shown in FIG. 5.

Referring to FIG. 7, FIG. 7 is a schematic view illustrating an operation principle of the image preprocessing controller 540 of the display device 500 shown in FIG. 5. The image preprocessing controller 540 can use the above formulas 1, 2 and 3 to convert the original image data (e.g. r, g, and b) of each pixel of the image to be displayed into the chromaticity data of CIE xyY. The chromaticity data of CIE xyY of each pixel includes the color coordinates x, y, and the brightness value Y. The image preprocessing controller 540 acquires the color coordinates (i.e. the color coordinates x and y) of each pixel of the image to be displayed based on the chromaticity data of CIE xyY of each pixel, that is, the color coordinates x, y, and the brightness value Y, and further acquires a range defined by the color coordinates of each pixel of the image to be displayed, that is, the color gamut range of the image to be displayed. Further, the image preprocessing controller 540 further acquires the brightness value Y of each pixel of the image to be displayed based on the chromaticity data of CIE xyY of each pixel, so that the image preprocessing controller 540 can generate the first control signal based on the maximum brightness value of the pixels of the image to be displayed to control the brightness of the first light emitted by the light source device 510, so as to control the amount of the first light.

Specifically, the image preprocessing controller 540 calculates the brightness value of the first light based on the maximum brightness value of the pixels of the image to be displayed, and generates the first control signal for controlling the amount of the first light based on the brightness value of the first light. It can be understood that, in one embodiment, the greater the maximum brightness value, the greater the amount of the first light, that is, the maximum brightness value and the amount of the first light can be in a proportional relationship.

The image preprocessing controller 540 further determines the current gamut range based on the color gamut range of the image to be displayed. The current color gamut range is a triangular region, and covers the color gamut range of the image to be displayed, that is, the current color gamut range covers the color coordinates of each pixel of the image to be displayed. Specifically, the current color gamut range can be a color gamut region exactly covering the color coordinates of each pixel of the image to be displayed and having the smallest area. It can be understood that, due to different content of each image to be displayed, the color gamut range of each image to be displayed (e.g. a frame of the image to be displayed) can also be different, and thus, the current color gamut range determined by the image preprocessing controller 540 based on each image to be displayed can also be different. The color coordinates of the three vertices $r_0''$, $g_0''$, and $b_0''$ of the current color gamut range determined by the image preprocessing controller 540 based on the original image data of the image to be displayed are assumed to be $(x_r'', y_r'', Y_r'')$, $(x_g'', y_g'', Y_g'')$, and $(x_b'', y_b'', Y_b'')$. And the color coordinates $(x_r'', y_r'', Y_r'')$, $(x_g'', y_g'', Y_g'')$, and $(x_b'', y_b'', Y_b'')$ of the three vertices $r_0''$, $g_0''$, and $b_0''$ of the current color gamut range can be formulated in following formula 10:

$$\begin{bmatrix} r_0'' \\ g_0'' \\ b_0'' \end{bmatrix} = \begin{bmatrix} x_r'' & y_r'' & Y_r'' \\ x_g'' & y_g'' & Y_g'' \\ x_b'' & y_b'' & Y_b'' \end{bmatrix}. \quad \text{(formula 10)}$$

Further, tristimulus values X, Y, and Z of the pixel calculated based on the corresponding image data r", g", and b" of any pixel displaying the current color gamut range are shown in formula 11:

$$\begin{bmatrix} X \\ Y \\ Z \end{bmatrix} = C'' \begin{bmatrix} r'' \\ g'' \\ b'' \end{bmatrix}. \quad \text{(formula 11)}$$

The conversion matrix C" is a conversion matrix required when calculating the corresponding tristimulus values X, Y, and Z based on the image data of any pixel of the current color gamut range. The conversion matrix C" conforms to following formula 12:

$$C'' = \begin{bmatrix} \frac{x_r''}{y_r''} Y_r'' & \frac{x_g''}{y_g''} Y_g'' & \frac{x_b''}{y_b''} Y_b'' \\ Y_r'' & Y_g'' & Y_b'' \\ \frac{1 - x_r'' - y_r''}{y_r''} Y_r'' & \frac{1 - x_g'' - y_g''}{y_g''} Y_g'' & \frac{1 - x_b'' - y_b''}{y_b''} Y_b'' \end{bmatrix}. \quad \text{(formula 12)}$$

Specifically, the image preprocessing controller determines corresponding information of the current gamut range by determining the current gamut range. In one embodiment, the information of the current color gamut range can include the conversion matrix C" required when calculating the corresponding tristimulus values X, Y, and Z based on the image data of any pixel of the current color gamut range. But in a modified embodiment, the information of the color gamut range on which the original image data of the image to be displayed is based can also be the color coordinates $(x_r', y_r', Y_r')$, $(x_g', y_g', Y_g')$, and $(x_b', y_b', Y_b')$ of the three vertices $r_0'$, $g_0'$, and $b_0'$, or designated characters or codes representing the information of the color gamut range, etc., which is not limited to the above.

Specifically, based on the formula 2, C is the conversion matrix required when calculating the corresponding tristimulus values X, Y, and Z based on the original image data r, g, and b of each pixel of the image to be displayed and the information of the color gamut range to which it belongs; based on the formula 6, C' is the conversion matrix required when calculating the corresponding tristimulus values X, Y, and Z based on the image data r', g', and b' of any pixel of the default color gamut range; based on the formula 11, C" is the conversion matrix required when calculating the corresponding tristimulus values X, Y, and Z based on the image data r", g", and b" of any pixel of the current color gamut range. The image preprocessing device 540 converts the original image data r, g, and b into the corresponding corrected image data r''', g''', and b''' by following formula 13:

$$\begin{bmatrix} r''' \\ g''' \\ b''' \end{bmatrix} = C^{-1} C' C''^{-1} C \begin{bmatrix} r \\ g \\ b \end{bmatrix} = C' C''^{-1} \begin{bmatrix} r \\ g \\ b \end{bmatrix}. \quad \text{(formula 13)}$$

Further, after the light modulation device 550 receives the corrected image data g''', b''', the image data r", g", b" (therein r", g", b" are also image data for modulation of the light modulation device 550) corresponding to the current gamut range calculated based on the stored color gamut conversion matrix T will conform to following formula 14:

$$\begin{bmatrix} r'' \\ g'' \\ b'' \end{bmatrix} = T \times \begin{bmatrix} r''' \\ g''' \\ b''' \end{bmatrix} = \qquad \text{(formula 14)}$$

$$C'^{-1}C \times C^{-1}C'C''^{-1}C \begin{bmatrix} r \\ g \\ b \end{bmatrix} = C''^{-1}C \begin{bmatrix} r \\ g \\ b \end{bmatrix} = C''^{-1} \begin{bmatrix} X \\ Y \\ Z \end{bmatrix}.$$

Further, based on the formula 14, the light modulation device 550 receives the corrected image data r''', g''', and b''', and further calculates the image data r'', g'', and b'' corresponding to the current color gamut range based on the fixed color gamut conversion formula T which is internally stored. The light modulation device 550 further modulates the required light of light source based on the image data r'', g'', and b'' to accurately restore the pixels of the image to be displayed.

Based on the described principles, in the embodiment, the image preprocessing controller 540 can calculate a corrected conversion formula based on the determined information of the current gamut range (such as the conversion matrix C''), the information of the color gamut range (such as the conversion matrix C) on which the original image data of the image to be displayed is based, and the color gamut conversion formula T of the display device 500. Based on the formula 13, the corrected conversion formula is C'C''$^{-1}$. The image preprocessing controller 540 further converts the original image data r, g, b of the image to be displayed into the corrected image data r''', g''', and b''' based on the corrected conversion formula. The light modulation device 550 converts the corrected image data r''', g''', and b''' into the image data r'', g'', and b'' corresponding to the current color gamut range based on the color gamut conversion formula T.

Further, based on the formula 13, the image preprocessing controller 540 needs to acquire the conversion matrix C, the conversion matrix C', and the conversion matrix C'' based on the received original image data of the image to be displayed. It can be seen from the foregoing analysis, the conversion matrix C is determined by the color gamut range to which the original image data of the image to be displayed belongs. The original image data of the image to be displayed is known, the color gamut range to which the original image data of the image to be displayed belongs is also known, the conversion matrix C is thus known. The conversion matrix C' is determined by the default color gamut range of the display device 500, that is, determined by the conversion formula T stored in the light modulation device 550, and thus, the conversion matrix C' is also known. Further, when the image preprocessing controller 540 determines the current color gamut range based on the original image data of the image to be displayed, that is, acquires the three vertices of the current color gamut range, the conversion matrix C'' is also known. When C, C', and C'' are all known, the corrected image data g''', and b''' can be calculated based on the original image data r, g, and b.

In the embodiment, the first color gamut range, the second color gamut range, and the current color gamut range are all triangular regions. As to how to acquire the current color gamut range, it can be seen from the foregoing analysis that the image preprocessing controller 540 can acquire the color gamut range of the image to be displayed (F3 shown in FIG. 6; it is understood that F3 refers to an irregular shaded area composed of the color coordinates of the pixels) by calculating the color coordinates of each pixel of the image to be displayed. Generally, the current color gamut range (F4 shown in FIG. 6) can be a color gamut region exactly covering the color coordinates of the pixels of the image to be displayed and having the smallest area. Referring to FIG. 6, three vertices of the first color gamut range respectively corresponding to the three primary colors are assumed to be R1, G1, and B1, three vertices of the second color gamut range respectively corresponding to the three primary colors are assumed to be R2, G2, and B2, three vertices of the current color gamut range corresponding to the three primary colors can be respectively located on a connection line between R1 and R2, a connection line between G1 and G2, and a connection line between B1 and B2. Specifically, after the color gamut range of the image to be displayed is acquired, the vertices R0, G0, and B0 are respectively selected on the connection line between R1 and R2, the connection line between G1 and G2, and the connection line between B1 and B2 in such an manner so that the region surrounded by the vertices R0, G0, and B0 exactly covers the color coordinates of the pixels of the image to be displayed, and the area of the region surrounded by the vertices R0, G0, and B0 is the smallest compared with the region surrounded by any other three vertices on the three connection lines. In other words, in the case that the region surrounded by the vertices R0, G0, and B0 can cover the color coordinates of the pixels of the image to be displayed, the points on the three connection lines respectively closest to R1, G1, and B1 are selected as the vertices. Of course, it is understood that, if the color gamut range of the image to be displayed has a portion exceeding the second color gamut range F2 (i.e. a portion other than the triangular region surrounded by the vertices R2, G2, and B2), since the light source device 510 cannot generate light exceeding the second color gamut range F2 due to its ability, at this time, the current color gamut range can be determined as a maximum color gamut range (i.e. the second color gamut range) that the light source device 510 can display. It can be understood that, in the embodiment, the vertex B1 overlaps with the vertex B2.

It can be seen that, based on the above principles, the image preprocessing controller 540 can determine the current color gamut range by acquiring the color coordinates of the pixels of the image to be displayed, that is, acquire the three vertices R0, G0, and B0 of the current color gamut range, and the conversion matrix C'' is thus acquired.

Further, based on the foregoing analysis, the image preprocessing controller 540 acquires the current color gamut range of the image to be displayed. In order to accurately restore the image to be displayed, the color gamut range of mixed light of the first light and the second light emitted by the light source device 510 is also needed to be identical with the current color gamut range. Specifically, based on the foregoing analysis, the image preprocessing controller 540 generates the first control signal based on the maximum brightness value in the brightness values Y of the pixels of the image to be displayed, to control the brightness of the first light emitted by the light source device 510, so as to control the amount of the first light. The image preprocessing controller 540 can further calculate the amount of the second light corresponding to the first light with the brightness based on the current color gamut range that the mixed light of the first light and the second light needs to reach, and further generates the second control signal based on a calculating result of the amount of the second light, for controlling the amount of the second light emitted by the light source device 510, so that the color gamut range of the mixed light of the first light and the second light can exactly be identical with the current color gamut range. Specifically, the amount of the second light can be controlled by controlling the brightness of the second light provided from the light source device 510 to the light modulation device 550 within the modulation time of the image to be displayed.

Specifically, if the color coordinates of the pixels of the image to be displayed acquired by the image preprocessing controller 540 are all located in the first color gamut range F1, that is, the color gamut range of the image to be displayed is located in the first color gamut range F1, the image preprocessing controller 540 can determine the first color gamut range F1 as the current color gamut range, and the image preprocessing controller 540 can transmit the light amount control signals (including the first control signal and the second control signal). At this time, based on the light amount control signals, for the light source device 510, the second light can be turned off, the light source device 510 emits the first light, and the amount of the first light can reach a maximum value. The image preprocessing controller 540 calculates the corrected image data r''', g''', and b''' based on the formula 12. The light modulation device 550 calculates the image data r'', g'', and b'' of the current color gamut range based on the corrected image data r''', g''', and b''', and modulates the first light based on the image data of the current color gamut range, so as to acquire image light that accurately restores the image.

If parts of the color coordinates of the pixels of the image to be displayed acquired by the image preprocessing controller 540 exceed the second color gamut range F2 or are located at a portion of a borderline of the second color gamut range F2, that is, the color gamut range F3 of the image to be displayed has a portion exceeding the second color gamut range F2 or includes a portion of the borderline of the second color gamut range F2, the image preprocessing controller 540 can determine the second color gamut range F2 as the current color gamut range, and the image preprocessing controller 540 can transmit the light amount control signals (including the first control signal and the second control signal). At this time, based on the light amount control signals, for the light source device 510, the first light can be turned off, the light source device 510 emits the second light, and the amount of the second light can reach a maximum value. The image preprocessing controller 540 calculates the corrected image data r''', g''', and b''' based on the formula 12, and the light modulation device 550 calculates the image data r'' g'', and b'' for modulation based on the corrected image data g''', and b''', and modulates the second light based on the image data r'' g'', and b'' for modulation, so as to acquire the image light that accurately restores the image.

It can be understood that, if parts of the color coordinates of the pixels of the image to be displayed acquired by the image preprocessing controller 540 exceed the first color gamut range F1, but do not exceed the borderline of the second color gamut range F2, that is, the color gamut range F3 of the image to be displayed exceeds the first color gamut range F1, but does not exceed the borderline of the second color gamut range F2, the image preprocessing controller 540 can select the region surrounded by the vertices R0, G0, and B0 as the current color gamut range F4. At this time, the current color gamut range F4 is located between the first color gamut range F t and the second color gamut range F2, and covers the color gamut range F3 of the image to be displayed. The first control signal in the light amount control signals is acquired based on the maximum brightness value of the pixels of the image to be displayed, so that the first control signal controls the light source device to emit the first light corresponding to the maximum brightness value of the pixels of the image to be displayed. The second control signal in the light amount control signals can be calculated based on the amount of the first light (i.e. the brightness of the first light) and the current color gamut range F4, so that the amount of the second light emitted by the light source device 510 can be controlled. The image preprocessing controller 540 calculates the corrected image data r''', g''', and b''' based on the formula 12. The light modulation device 550 calculates the image data r'', g'', and b'' corresponding to the current color gamut range (in other words, the image data r'' g'', and b'' for modulation) based on the corrected image data r''', g''', and b''', and modulates the first light and the second light based on the image data r'', g'', and b'', so as to acquire the image light that accurately restores the image.

It should be noted that, since the light amount control signals are not linearly related to the brightness of the first light and the second light emitted by the light source device 510, gamma compensation is needed to be performed on the light amount control signals provided to the light source device 510, so as to realize a linear mapping between the light amount control signals and the brightness of the first light and the second light. Thus, the display device 500 is further provided with a gamma correction circuit 530 which is configured to receive the light amount control signals and transmit corrected signals based on the light amount control signals to the light source driving circuit 520, so as to control the driving signal transmitted by the light source driving circuit 520. The light source driving circuit 520 further controls the amount of the first light and the second light emitted by the light source device 510 based on the driving signal. The gamma correction circuit 530 stores a number of light amount control signals and a number of corrected signals which one-to-one corresponds to the number of light amount control signals. After the gamma correction circuit 530 receives a light amount control signal output by the image preprocessing controller 540, the gamma correction circuit 530 searches for the corrected signal one-to-one corresponding to the light amount control signal based on the light amount control signal, and provides the corrected signal to the light source driving circuit 520. It can be understood that, the gamma correction circuit 530 can adopt a look-up table.

The light modulation device 550 can include a control chip 551 and a modulator 552. The control chip 551 internally stores the color gamut conversion formula T, and is configured to receive the corrected image data and calculate the image data for modulation based on the color gamut conversion formula T. The modulator 552 can be a DMD modulator, but is not limited to the DMD modulator. For example, the modulator 552 can also be a LCOS modulator. The modulator 552 modulates the light emitted by the light source device 510 based on the image data for modulation to generate the image light. The modulator 552 can include a number of modulation units (e.g. reflector units), and each modulation unit can correspond to the image data for modulation of a pixel and modulate (e.g. reflect) the corresponding light of light source under the control of the image data for modulation, to generate the corresponding image light.

Further, the number of modulators 552 is not limited, and can be one, two, or more. For example, one modulator is configured to modulate the first light and the second light in sequence, or two modulators are configured to respectively modulate the first light and the second light, or three modulators are configured to respectively modulate the lights of three different primary colors in the mixed light of the first light and the second light, or two modulators are configured to respectively modulate the lights of three different primary colors in the mixed light of the first light and the second light (therein one modulator modulates the lights of two primary colors, and the other modulates the light of one primary color), or six modulators are configured to respectively modulate the lights of three different primary colors in the first light and the lights of three different primary colors in the second light, etc. Since it is difficult to list all the embodiments, the others are not described herein.

The image synthesizing device 560 is used to project the image light generated by the light modulation device 550 to display an image. Specifically, the image synthesizing device 560 can include a light splitting module 561 and a projection lens 562. In one embodiment, the light splitting module 561 can be located between the light source device 510 and the light modulation device 550. That is, the first light and the second light emitted by the light source device 510 can be provided to the light modulation device 550 via the light splitting module 561, the image light generated by the light modulation device 550 can further be guided to the projection lens 562 via the light splitting module 561, and the projection lens 562 projects the image light to a predetermined area or an object (such as a projection screen, a wall, or a designated location in the space) to display the images.

Compared with the prior art, in the display device 500 of the present disclosure, the current color gamut range F4 and the amount of the first light and the second light corresponding to the current color gamut range F4 are determined based on the color gamut range F3 of the image to be displayed and the brightness values of the pixels, and the first light and the second light with the corresponding amount are modulated based on the image data corresponding to the current color gamut range F4, so that not only the display of image data with a wide color gamut is realized, adjusting the amount of the first light and the second light based on the current color gamut range F4 can also enable to minimally utilize the wide color gamut light (i.e. the second light), thereby reducing the use of the second light, and further reducing the cost of the light source device 510. Further, due to the reduced use of the second light, the power and heat dissipation requirements of the light source device 510 are reduced with a certain extent., a complicated heat dissipation system is not required, and the cost can thus be reduced.

Further, it can be seen from the above embodiments, the light modulation device 550 needs to internally pre-store the color gamut conversion formula T, so that the image preprocessing controller 540 needs to consider the presence of the color gamut conversion formula T, and convert the original image data r, g, and b into the corrected image data r''', g''', and b''' based on the formula 12. Specifically, the image preprocessing controller 540 can acquire the conversion matrix C' (which can be acquired based on the color gamut conversion formula T pre-stored in the light modulation device 550), further calculate the current color gamut range F4 based on the original image data of the image to be displayed, acquire the conversion matrix C'' based on the formula 11, and calculate the corrected image data r''', g''', and b''' based on the original image data r, g, and b, (for example, the corrected image data is calculated by the conversion matrix of the original image data r, g, and b multiplied by C'C''$^{-1}$). Further, the light modulation device 550 receives the corrected image data r''', g''', and b''', and further converts the corrected image data r''', g''', and b''' into the image data r'', g'', and b'' for modulation based on the pre-stored color gamut conversion formula T. The image data r'', g'', and b'' for modulation is the image data based on the current color gamut range F4. The light modulation device 550 further modulates the light of light source corresponding to the current color gamut range F4 based on the image data of the current color gamut range F4, to accurately restore the image to be displayed.

Based on the above principles, however, in a first modified embodiment, if the light modulation device 550 does not need to pre-store the color gamut conversion formula T, but directly receives the image data output by the image preprocessing controller 540 and directly modulates the light based on the received image data (i.e. it is not needed to convert the received image data into the image data for modulation), then at this time, the image data output by the image preprocessing controller can be the image data r'', g'', and b'' based on the current color gamut range F4. Further, in the modified embodiment, the image preprocessing controller 540 can directly calculate r'', g'', and b'' based on the original image data r, g, and b, it can be seen based on the above formula 14:

$$\begin{bmatrix} r'' \\ g'' \\ b'' \end{bmatrix} = \qquad \text{(formula 14)}$$

$$T \times \begin{bmatrix} r''' \\ g''' \\ b''' \end{bmatrix} = C'^{-1} C \times C^{-1} C' C''^{-1} C \begin{bmatrix} r \\ g \\ b \end{bmatrix} = C''^{-1} C \begin{bmatrix} r \\ g \\ b \end{bmatrix}.$$

since the conversion matrix C is known, the image preprocessing controller 540 can determine the current color gamut range F4 after analyzing the original image data of the image to be displayed, and further acquire the conversion matrix C''. The image preprocessing controller 540 can thus calculate the image data r'', g'', and b'', and provide the image data r'', g'', and b'' to the light modulation device 550 as the output image data, without further data conversion of the control chip 551 of the light modulation device 550. It can be understood that, in the first modified implementation, the principles and steps of how the image preprocessing controller 540 generates the light amount control signals and determines the current color gamut range F4 can be basically the same as those of the foregoing implementation, the details are not described herein.

Figure 8:
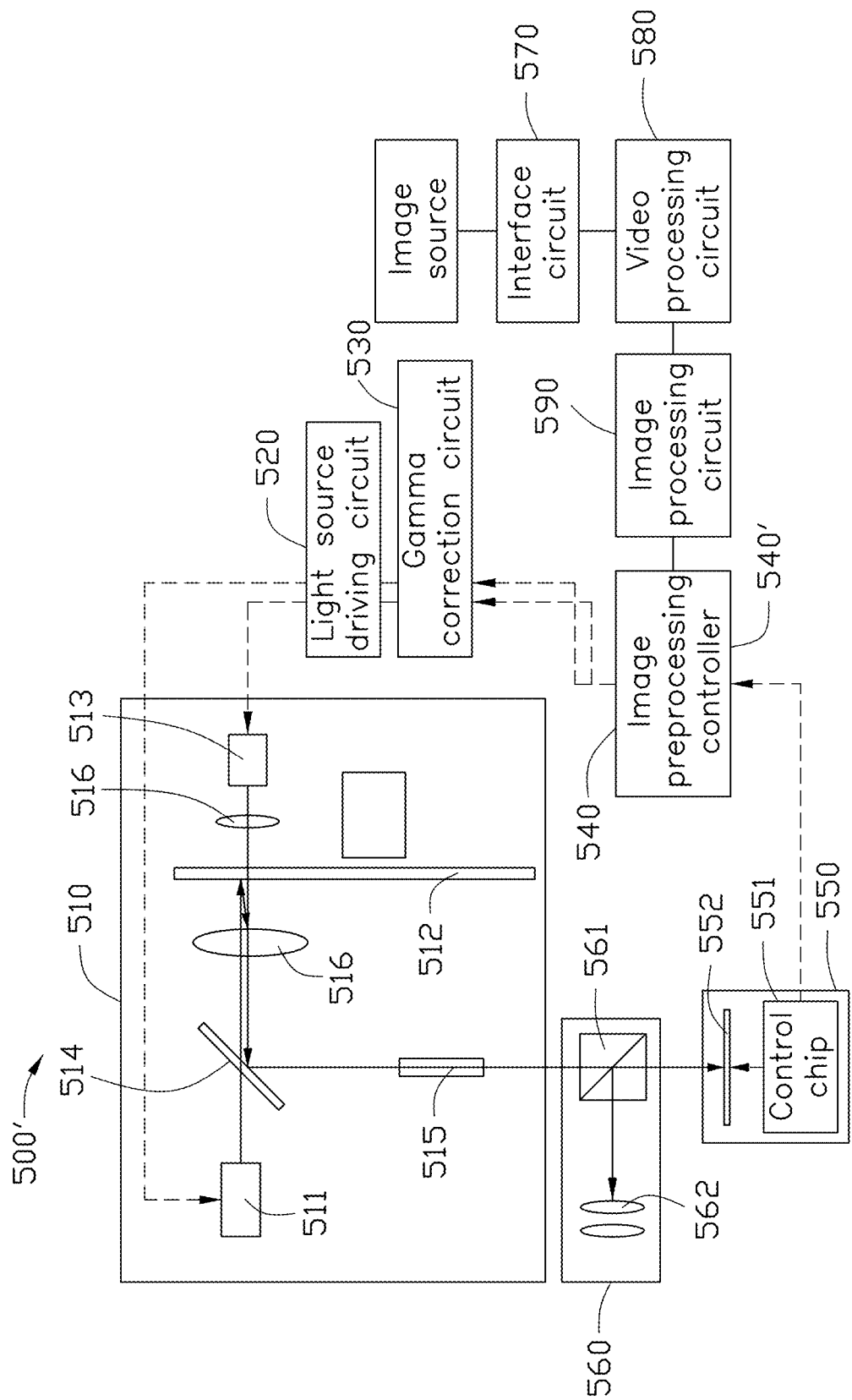
FIG. 8 is a schematic view of a structure of a display device based on a modified embodiment of display device that shown in FIG. 5.

Further, based on the above principles, in a second modified embodiment, referring to FIG. 8, the image preprocessing controller 540' can calculate a color gamut conversion formula T' required by the light modulation device 550' with respect to the current gamut range F4 in real time based on the original image data of the image to be displayed. T'=C''$^{-1}$C. The image preprocessing controller 540' further provides the color gamut conversion formula T' to the light modulation device 550'. At this time, the light modulation device 550' can receive the color gamut conversion formula T' and the original image data r, g, and b, calculate the image data r'', g'', and b'' for modulation based on the above formula 13, and further modulate the corresponding light of light source based on the image data r'', g'', and b'', to accurately restore the image to be displayed. It can be understood that, in the second modified implementation, the principles and steps of how the image preprocessing controller 540' generates the light amount control signals and determines the current color gamut range F4 can be basically the same as those of the foregoing implementation, and the details are not described herein.

It can be understood that, in the above embodiments, three primary color display devices are taken as an example to illustrate the principle of color conversion. For display devices using four primary colors or five primary colors, C' can be a matrix of 4×3 or 5×3, and determinant values of pseudo-inverse matrix of C' are zero, so that a conversion from the XYZ space to the primary color space of the corrected image data (r', g', and b') has infinite solutions. $C'^{-1}$ can be written as C'', which is a certain conversion matrix from the XYZ space to the primary color space of the corrected image data (r', g', and b'). The conversion matrix can be solved by an added certain restriction condition, such as maximizing white light in an RGBW system, or allocating brightness of primary colors as average as possible, etc.

Further, color calibration of the display device is the calibration of C'. The color coordinates of the three vertices $r_0'$, $g_0'$, and $b_0'$ of the color gamut range of the display device can be respectively acquired as $(x_r', y_r', Y_r')$, $(x_g', y_g', Y_g')$, and $(x_b', y_b', Y_b')$ by accurately measuring the color coordinates and the brightness values of lights of the three primary colors from the light source device of the display device, an accurate C' is thus generated, thereby ensuring the accuracy of color display of the display device. Existing display devices including flat panel display devices and projection display devices, or including three primary colors and multiple primary colors display devices, the three primary colors of light of the display devices are fixed and unchanged, and a ratio of the amount (such as a brightness ratio) of lights of the three primary colors does not dynamically change with the content of the image. Thus, the number of color calibration of the traditional display devices can be one or a limited number. However, for the display devices 500, 500' of the present disclosure, the amount of the first light and the second light are mainly determined by the image preprocessing controller 540, 540' based on the original image data of the image to be displayed, the image preprocessing controller 540, 540' further generates the light amount control signals for controlling the amount of the first light and the second light, to control the amount of the first light and the second light emitted by the light source devices 550, 550'. Thus, the ratio of the amount of lights of the three primary colors of the display devices 500, 500' is dynamically changed, that is, the ratio of the amount of lights of the three primary colors emitted by the light source devices 510, 510' can change depending on the content of each image to be displayed. As a result, in each frame of image, the conversion matrix C'' corresponding to the current gamut range F4 of the display devices 500, 500' can change depending on change of the content of each image to be displayed. The display devices with fixed color conversion in prior art cannot meet this requirement. The display device 500, 500' provided by the present invention can dynamically calculate the conversion matrix C'' based on the original image data of each image to be displayed, and control the amount of the first light and the second light emitted by the light source devices 510, 510', to control the ratio of the amount of lights of the three primary colors. The display device 500, 500' can further calculate the image data r'', and g'', b'' based on the amount of the first light and the second light, and further modulate the first light and the second light based on the image data r'', g'', and b'' to display the image, so that the image data and the corresponding light of light source of each image are adapted to the current color gamut range F4 of the image. That is, each image is displayed based on the dynamic color gamut.

Figure 9:
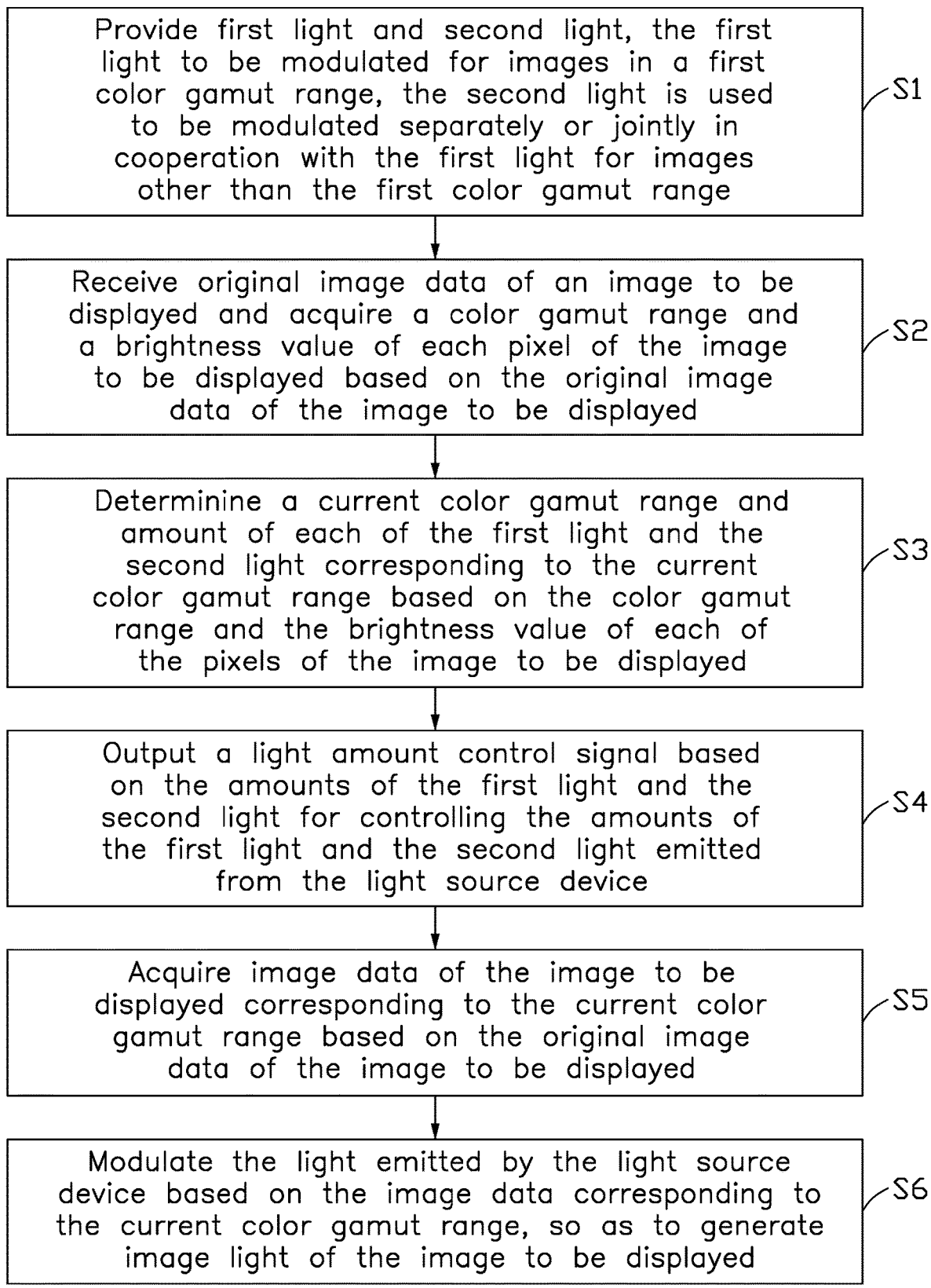
FIG. 9 is a flowchart of a display method based on a preferred embodiment of this disclosure.

Referring to FIG. 9, FIG. 9 is a flowchart of a display method based on one preferable embodiment of the present disclosure. The display method can be applied to the display devices 500, 500' of any one of the above embodiments and display devices of modified embodiments. The display method can include the following steps S1-S6.

Step S1, provide first light and second light. The first light is used to be modulated for images in a first color gamut range, a color gamut range of the second light is wider than that of the first light, the second light is used to be modulated separately modulate or jointly in cooperation with the first light for images other than the first color gamut range. The first light and the second light can be provided by the above-mentioned light source device 510. The function and working principle of the light source device 510 have been described specifically above, the details will not be repeated here.

Step S2, receive original image data of an image to be displayed and acquire a color gamut range and a brightness value of each pixel of the image to be displayed based on the original image data of the image to be displayed.

Step S3, determine a current color gamut range and amount of each of the first light and the second light corresponding to the current color gamut range based on the color gamut range and the brightness value of each of the pixels of the image to be displayed.

Step S4, output a light amount control signal based on the amount of the first light and the second light for controlling the amount of the first light and the second light emitted from the light source device.

Steps S2, S3, and S4 can all be performed by the image preprocessing controller 540. The function and working principle of the image preprocessing controller 540 have been described specifically above, and the details will not be repeated here.

Step S5, acquire image data of the image to be displayed corresponding to the current color gamut range based on the original image data of the image to be displayed. Step S5 can be performed by the image preprocessing controller 540 (the embodiment shown in FIG. 5), or the image preprocessing controller 540 and the control chip 551 of the light modulation device 550 together (the first and second modified embodiments based on the embodiment shown in FIG. 5, as shown in FIG. 9).

Step S6, modulate light emitted by the light source device based on the image data corresponding to the current color gamut range, so as to generate image light of the image to be displayed. Step S6 can be performed by the light modulation device 550.

Compared with the prior art, in the display method of the present disclosure, the current color gamut range F4 and the amount of the first light and the second light corresponding to the current color gamut range F4 are determined based on the color gamut range F3 of the image to be displayed and the brightness value of each pixel, and the amount of the first light and the second light is modulated based on the corrected image data corresponding to the current color gamut range F4, the display of image data with a wide color gamut is realized, adjusting the amount of the first light and the second light based on the current color gamut range F4 can minimally utilize the light with the wide color gamut (i.e. the second light), thereby reducing the use of the second light, and further reducing the cost of the light source. Further, due to the reduced use of the second light, the power and heat dissipation requirements of the light source device 510 are reduced, a complicated heat dissipation system is not required, and the cost can thus be reduced.

The above are implementations of the present disclosure, and do not limit the scope of the present disclosure. Any equivalent structures or equivalent process transformation made by utilizing the content of the description and drawings of the present disclosure, or directly or indirectly applied to other related technical fields, are all similarly included in the scope of patent protection of the present disclosure.

What is claimed is:

1. A display device comprising:
a light source device that emits first light and second light; wherein the first light is used to be modulated for images of a first color gamut range, the second light is used to be modulated separately or, jointly in cooperation with the first light for images other than the first color gamut range, and a color gamut range of the second light is a second color gamut range which covers the first color gamut range and has a portion exceeding the first color gamut range;
an image preprocessing controller that receives original image data of an image to be displayed, and acquires a color gamut range and a brightness value of each of pixels of the image to be displayed based on the original image data of the image to be displayed, determines a current color gamut range and amount of each of the first light and the second light corresponding to the current color gamut range based on the color gamut range and the brightness value of each of the pixels of the image to be displayed, outputs a light amount control signal based on the amount of the first light and the second light for controlling the amount of the first light and the second light emitted from the light source device; and
a light modulation device that modulates light emitted by the light source device base on image data corresponding to the current color gamut range, so as to generate image light of the image to be displayed,
wherein the image data corresponding to the current color gamut range are acquired by the image preprocessing, controller or the light modulation device through converting the original image data of the image to be displayed.

2. The display device according to claim 1, wherein the image preprocessing controller acquires the brightness value of each of the pixels of the image to be displayed based on the original image data of the image to be displayed, and generates a first control signal based on a maximum brightness value of the pixels of the image to be displayed to control the amount of the first light emitted from the light source device.

3. The display device according to claim 1, wherein the image preprocessing controller acquires a color coordinate of each of the pixels of the image to be displayed based on the original image data of the image to be displayed, wherein a range defined by the color coordinates of the pixels of the image to be displayed is the color gamut range of the image to be displayed.

4. The display device according to claim 1, wherein:
the display device has a default color gamut range;
the light modulation device stores a color gamut conversion formula corresponding to the default color gamut range;
the image preprocessing controller calculates a corrected conversion formula based on information of the determined current color gamut range, information of the color gamut range on which the original image data of the image to be displayed is based, and information of the color gamut conversion formula of the display device;
the image preprocessing controller further converts the original image data of the image to be displayed into corrected image data based on the corrected conversion formula; and
the light modulation device converts the corrected image data into the image data corresponding to the current color gamut range based on the color gamut conversion formula.

5. The display device according to claim 4, wherein:
the information of the color gamut range on which the original image data of the image to be displayed is based comprises a conversion matrix C required when calculating corresponding tristimulus values X, Y, and Z based on the original image data of each of the pixels of the image to be displayed and information of a color gamut range to which each of the pixels belongs, the conversion matrix C is determined by color coordinates of three vertices of the color gamut range to which the original image data of each pixel of the image to be displayed belongs in a xyY coordinate system, the tristimulus values X, Y and Z conforms to the following formula:

$$\begin{bmatrix} X \\ Y \\ Z \end{bmatrix} = C \begin{bmatrix} r \\ g \\ b \end{bmatrix};$$

the color gamut conversion formula is $T=C'^{-1}C$, C' is a conversion matrix which is recorded by the light modulation device and required when calculating corresponding tristimulus values X, Y, and Z based on image data of any one of the pixels corresponding to the default color gamut range, the conversion matrix C' is determined by color coordinates of three vertices of the default color gamut range of the display device:
the information of the color current gamut range comprises a conversion matrix C" required when calculating corresponding tristimulus values X, Y, and Z based on image data of any one of the pixels corresponding to the current color gamut range, the conversion matrix C" is determined by color coordinates of three vertices of the current color gamut range;
the corrected image data r''', g''', and b''' corresponding to the original image data r, g, and b of any one of the pixels of the image to be displayed conforms to the following formula:

$$\begin{bmatrix} r''' \\ g''' \\ b''' \end{bmatrix} = C'C''^{-1} \begin{bmatrix} r \\ g \\ b \end{bmatrix},$$

the corrected conversion formula is $C'C''^{-1}$, the corrected image data r''', g''', and b''' is converted into the image data r'', g'', and b'' of the current color gamut range based on the following formula:

$$\begin{bmatrix} r'' \\ g'' \\ b'' \end{bmatrix} = T \begin{bmatrix} r''' \\ g''' \\ b''' \end{bmatrix}.$$

6. The display device according to claim 1, wherein the image preprocessing controller converts the original image data of the image to be displayed into the image data of the current color gamut range based on information of the determined current color gamut range and information of the color gamut range on which the original image data of the image to be displayed is based, and provides the image data of the current color gamut range to the light modulation device.

7. The display device according to claim 6, wherein:
the information of the color gamut range on which the original image data of the image to be displayed is based comprises a conversion matrix C required when calculating corresponding tristimulus values X, Y, and Z based on the original image data r, g, and b of each of the pixels of the image to be displayed and information of a color gamut range to which each of the pixels belongs, the conversion matrix C is determined by color coordinates of three vertices of the color gamut range to which the original image data of each pixel of the image to be displayed belongs in a xyY coordinate system, the tristimulus values X, Y, and Z conforms to the following formula:

$$\begin{bmatrix} X \\ Y \\ Z \end{bmatrix} = C \begin{bmatrix} r \\ g \\ b \end{bmatrix};$$

the information of the current color gamut range comprises a conversion matrix C'' required when calculating corresponding tristimulus values X, Y, and Z based on image data of any one of the pixels of the current color gamut range, the conversion matrix C'' is determined by color coordinates of three vertices of the current color gamut range; and
the image data r'', g'', and b'' of the current color gamut range corresponding to the original image data r, g, and b of any one of the pixels of the image to be displayed conforms to the following formula:

$$\begin{bmatrix} r'' \\ g'' \\ b'' \end{bmatrix} = C''^{-1} C \begin{bmatrix} r \\ g \\ b \end{bmatrix}.$$

8. The display device according to claim 1, wherein the image preprocessing controller calculates a color gamut conversion formula T' corresponding to the current color gamut range based on information of the determined current color gamut range, and information of the color gamut range on which the original image data of the image to be displayed is based, and provides the color gamut conversion formula T' to the light modulation device, and the light modulation device converts the original image data of the image to be displayed into the image data of the current color gamut range based on the color gamut conversion formula T';

wherein the color gamut conversion formula T'=C''⁻¹C a conversion matrix C is determined by color coordinates of three vertices of the color gamut range to which the original image data of each pixel of the image to be displayed belongs in a xyY coordinate system, a conversion matrix C'' is determined by color coordinates of three vertices of the current color gamut range.

9. The display device according to claim 8, wherein:
the information of the color gamut range on which the original image data of the image to be displayed is based comprises the conversion matrix C required when calculating corresponding tristimulus values X, Y, and Z based on the original image data r, g, b of each of the pixels of the image to be displayed and information of a color gamut range to which each of the pixels belongs, the tristimulus values X, Y, and Z conforms to the following formula:

$$\begin{bmatrix} X \\ Y \\ Z \end{bmatrix} = C \begin{bmatrix} r \\ g \\ b \end{bmatrix};$$

the information of the current color gamut range comprises the conversion matrix C'' required when calculating corresponding tristimulus values X, Y, and Z based on image data of any one of the pixels of the current color gamut range; and
the image data r'', g'', and b'' of the current color gamut range corresponding to the original image data r, g, and b of any one of the pixels of the image to be displayed conforms to the following formula:

$$\begin{bmatrix} r'' \\ g'' \\ b'' \end{bmatrix} = T' \begin{bmatrix} r \\ g \\ b \end{bmatrix}.$$

10. The display device according to claim 1, wherein in a case that the color gamut range of the image to be displayed exceeds the first color gamut range but does not exceed a borderline of the second color gamut range, the light source device is controlled with the light amount control signal to emit the first light and the second light to the light modulation device, and the current color gamut range is located between the first color gamut range and the second color gamut range.

11. The display device according to claim 10, wherein:
the image preprocessing controller determines the current color gamut range based on the color gamut range of the image to be displayed, and the current color gamut range is greater than or equal to the color gamut range of the image to be displayed, and smaller than the second color gamut range; and
the image preprocessing controller further determines the amount of the second light based on the determined amount of the first light and the current color gamut range, so as to enable mixed light of the first light and the second light to reach the current color gamut range.

12. The display device according to claim 1, wherein in a case that the color gamut range of the image to be displayed is in the first color gamut range, the second light is controlled with the light amount control signal to turn off, and the light source device emits the first light, wherein the current color gamut range is the first color gamut range.

13. The display device according to claim 1, wherein in a case that the color gamut range of the image to be displayed has a portion exceeding the second color gamut range or comprises a portion of a borderline of the second color gamut range, the light source device emits the second light, and the current color gamut range is the second color gamut range.

14. The display device according to claim 1, wherein the light source device comprises:
an excitation light source that emits excitation light;
a color wheel configured to receive the excitation light and emit the first light; and
a supplemental light source configured to emit supplemental light, wherein the supplemental light and at least a portion of the excitation light emitted by the excitation light source are taken as the second light, or the supplemental light is taken as the second light,
wherein the first light and the second light each comprises at least two colors of light, and the light amount control signal is used to control the excitation light emitted by the excitation light source and the supplemental light emitted by the supplemental light source so as to control the amount of the first light and the second light.

15. The display device according to claim 14, wherein the excitation light is light of a first color, the color wheel has fluorescence material and receives the excitation light to generate fluorescence, the first light emitted by the color wheel comprises the light of the first color and the fluorescence, the supplemental light comprises laser light, and the fluorescence and the supplemental light comprise same primary color component.

16. The display device according to claim 15, wherein the fluorescence comprises fluorescence of a second color and fluorescence of a third color, or comprises fluorescence of a fourth color which is obtained by mixing the second color and the third color, and the supplemental light comprises laser light of the second color and laser light of the third color, wherein the first color, the second color, and the third color are three primary colors.

17. The display device according to claim 1, further comprising:
a light source driving circuit configured to transmit a driving signal to drive the light source device to emit light; and
a gamma correction circuit configured to receive the light amount control signal and transmits a corrected signal based on the light amount control signal to the light source driving circuit to control the driving signal transmitted by the light source driving circuit, wherein the light source driving circuit further controls the amount of the first light and the second light emitted by the light source device based on the driving signal, the gamma correction circuit stores a plurality of light amount control signals and corrected signals which one-to-one corresponds to the plurality of light amount control signals,
wherein after receiving the light amount control signal output by the image preprocessing controller, the gamma correction circuit searches for the corrected signal, which one-to-one corresponds to the light amount control signal, based on the light amount control signal, and provides the corrected signal to the light source driving circuit.

18. A display method comprising:
providing first light and second light; wherein the first light is used to be modulated for images of a first color gamut range, the second light is used to be modulated separately or jointly in cooperation with the first light for images other than the first color gamut range;
receiving original image data of an image to be displayed and acquiring a color gamut range and a brightness value of each of pixels of the image to be displayed based on the original image data of the image to be displayed;
determining a current color gamut range and amount of each of the first light and the second light corresponding to the current color gamut range based on the color gamut range and the brightness value of each of the pixels of the image to be displayed;
outputting a light amount control signal based on the amount of the first light and the second light for controlling the amount of the first light and the second light emitted from a light source device;
acquiring image data of the image to be displayed corresponding to the current color gamut range based on the original image data of the image to be displayed; and;
modulating light emitted by the light source device based on image data corresponding to the current color gamut range, so as to generate image light of the image to be displayed.

* * * * *